US008422208B2

United States Patent
Wang

(10) Patent No.: US 8,422,208 B2
(45) Date of Patent: Apr. 16, 2013

(54) STAND FIXING MECHANISM AND ELECTRONIC DEVICE USING THE SAME

(75) Inventor: Kang Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 208 days.

(21) Appl. No.: 12/982,913

(22) Filed: Dec. 31, 2010

(65) Prior Publication Data

US 2012/0033359 A1    Feb. 9, 2012

(30) Foreign Application Priority Data

Aug. 3, 2010   (CN) ........................ 2010 1 0244191

(51) Int. Cl.
*H05K 5/00*   (2006.01)
*H05K 7/00*   (2006.01)
*H04M 1/00*   (2006.01)
*G09G 5/00*   (2006.01)

(52) U.S. Cl.
USPC ............ 361/679.01; 361/679.02; 361/679.55; 361/679.56; 361/679.57; 361/679.59; 455/575.1; 455/575.3; 345/156; 345/169

(58) Field of Classification Search ............. 361/679.01, 361/679.02, 679.08, 679.09, 679.3, 679.55–679.59; 455/325, 556.1, 550.1, 90.1, 575.1
See application file for complete search history.

(56) References Cited

U.S. PATENT DOCUMENTS

2009/0020672 A1 *   1/2009   Lai et al. .................... 248/274.1

FOREIGN PATENT DOCUMENTS

| CN | 101330807 A |   | 12/2008 |
|----|-------------|---|---------|
| TW | 200920981 A | * | 5/2009  |
| TW | 200942718 A |   | 10/2009 |
| TW | 200920981 A |   | 5/2010  |

* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

An electronic device with a stand fixing mechanism is provided. The electronic device includes a main body, a stand, and a stand fixing mechanism. The stand is fixed in the main body to support the main body. The stand fixing mechanism includes a first connection member within the main body and a second connection member at one end of the stand. The first connection member defines a first cutout and a third cutout. A first and a second protruding member protrude from the second connection member. The first cutout receives and the second cutout correspondingly receive the first and second protruding member when the stand is fixed to the main body, a securing force applied to the first protruding member by the first cutout is greater than that applied to the second protruding member by the second cutout. An electronic device applying the stand fixing mechanism is also provided.

18 Claims, 6 Drawing Sheets

STAND FIXING MECHANISM AND ELECTRONIC DEVICE USING THE SAME

BACKGROUND

1. Technical Field

The present disclosure relates to stand fixing mechanisms and electronic devices, particularly, to an electronic device and a stand fixing mechanism applied therein.

2. Description of the Related Art

A stand is generally designed to support an electronic device, such as a digital photo frame (DPF), on a floor or a table. When the electronic device falls from a table, the free end of the stand may be the first to hit the floor, and the stand may experience a sudden force, which may cause damage to the stand and the housing of the electronic device.

Therefore, what is needed is a stand fixing mechanism applied in an electronic device to overcome the above-mentioned shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
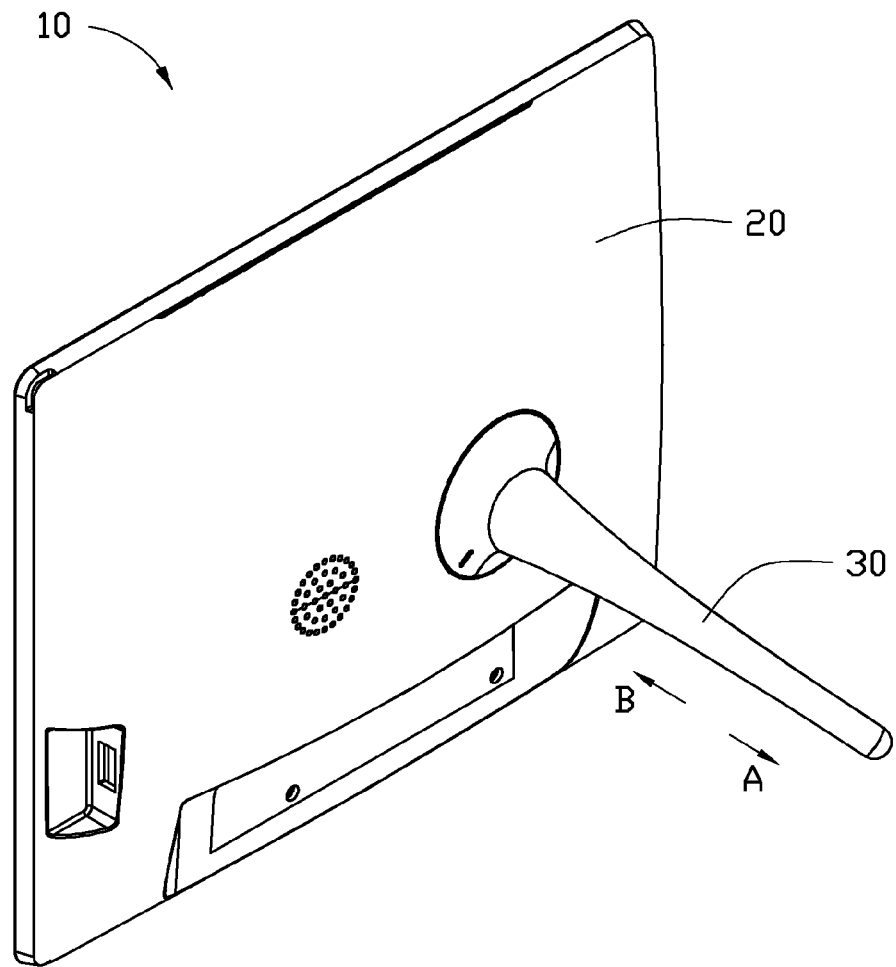
FIG. 1 is a perspective view of an electronic device having a stand in accordance with an exemplary embodiment.
Figure 2:
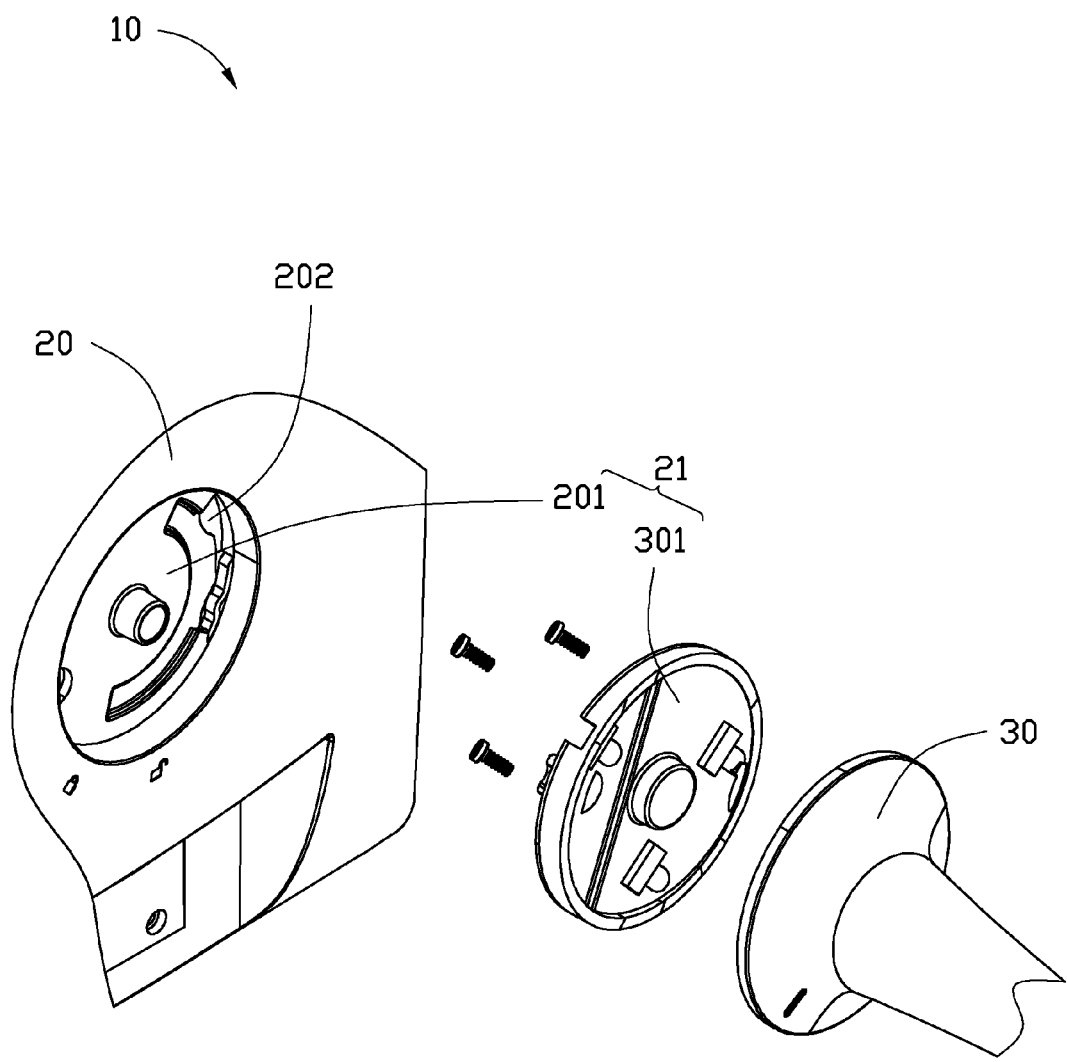
FIG. 2 is an isometric, exploded view illustrating a stand fixing mechanism for connecting the stand to a main body of the electronic device of FIG. 1.

Referring to FIG. 1, an electronic device 10 includes a main body 20 and a stand 30 mounted to the main body 20 through a stand fixing mechanism 21 (shown in FIG. 2). The stand 30 is used for supporting the device 10 on a table or a floor. The device 10 can be a digital photo frame (DPF), a display apparatus, an e-reader, or a PDA.

Referring to FIG. 2, the stand fixing mechanism 21 includes a first connection member 201 and a second connection member 301. In the exemplary embodiment, the main body 20 defines a cavity 202. The first connection member 201 is received in the cavity 202 and is integrally formed with the main body 20. The second connection portion 301 can be threadedly connected to an end of the stand 30. In an alternative embodiment, the second connection member 301 may be integrally formed with the end of the stand 30.

Figure 3:
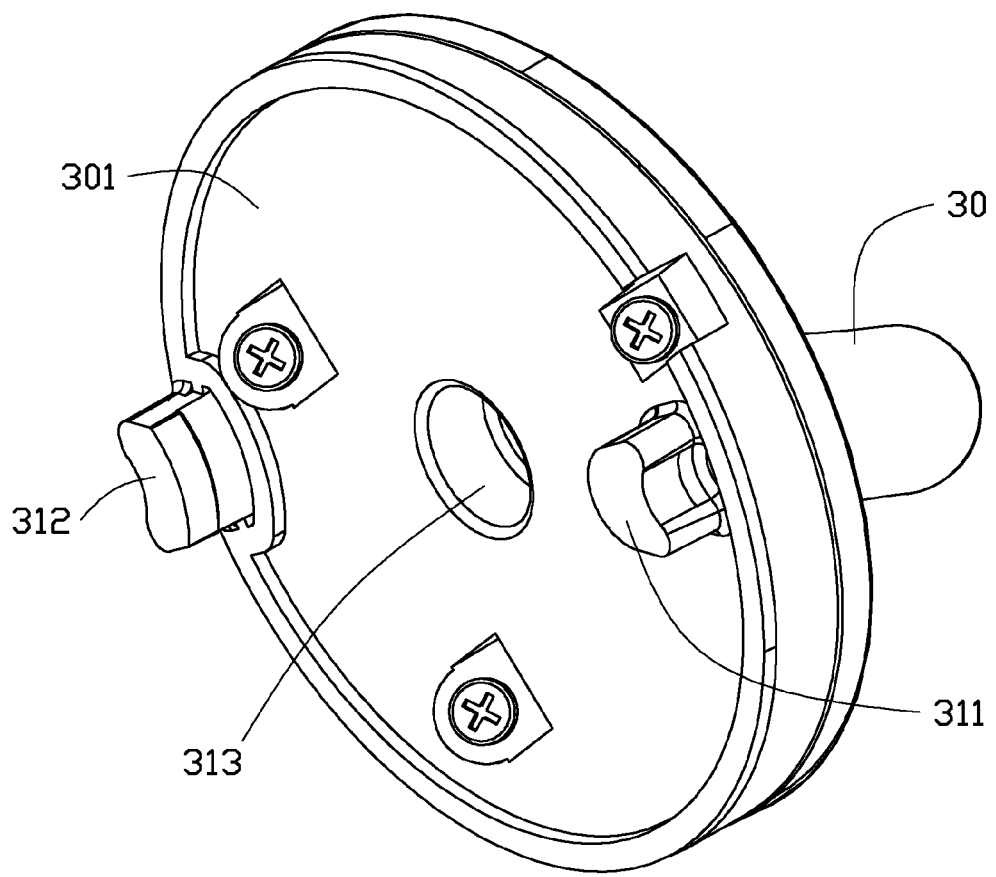
FIG. 3 is an isometric view of the stand of FIG. 1.

Referring to FIG. 3, a first protruding member 311 and a second protruding member 312 protrude from the second connection member 301 near the edge of the second connection member 301. The size of the free ends of the protruding members 311, 312 are greater than the fixed ends of the protruding members 311, 312. In the exemplary embodiment, the members 311, 312 are disposed on the exterior edges of the second connection member 301.

Figure 4:
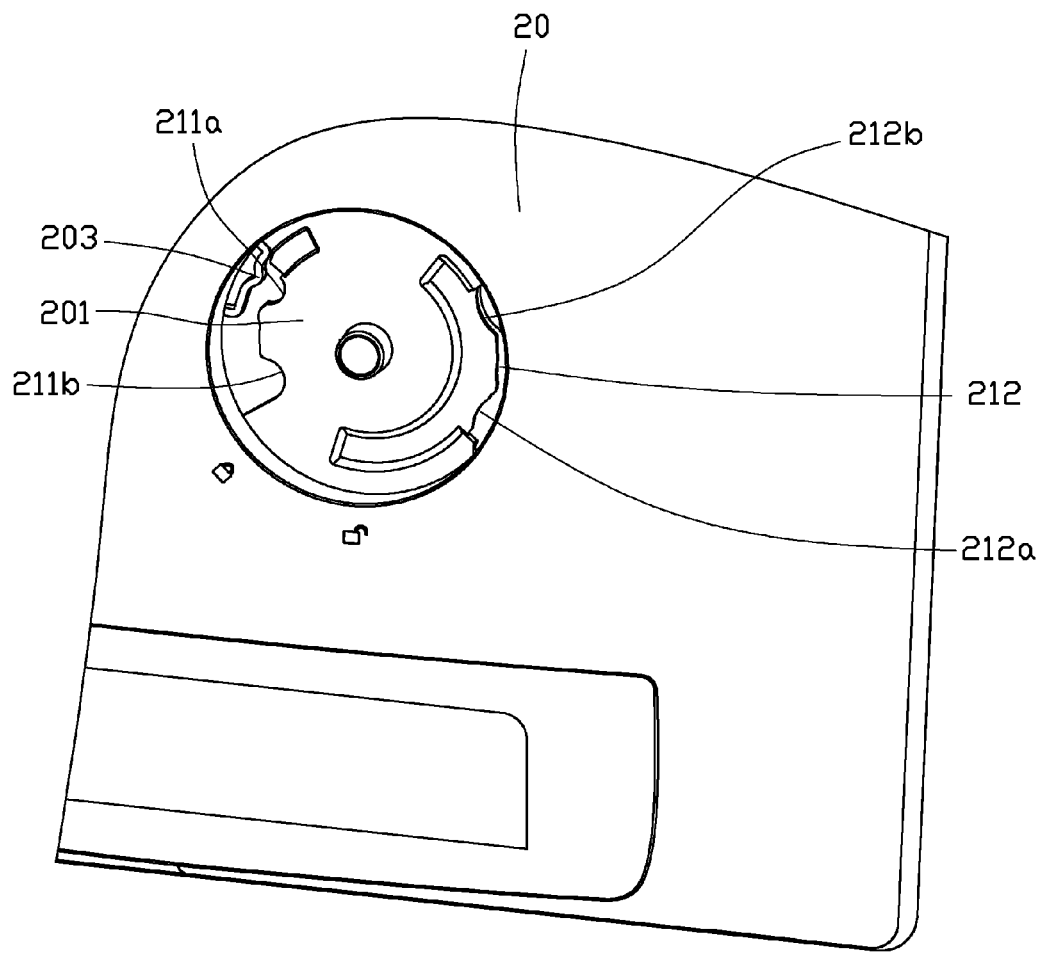
FIG. 4 is an isometric view of a first connection member of stand fixing mechanism of FIG. 2.

Referring to FIG. 4, a first opening 211, and a second opening 212 are defined in the first connection member 201. A first cutout 211a and a third cutout 211b are defined in the first connection member 201, and communicate with the first opening 211; and a second cutout 212a and a fourth cutout 212b are defined in an interior edge of the first connection 212b and communicate with the second opening 212. A protrusion 203 is also disposed on the interior edge around the first opening 211 and is opposite to the first cutout 211a.

Figure 6:
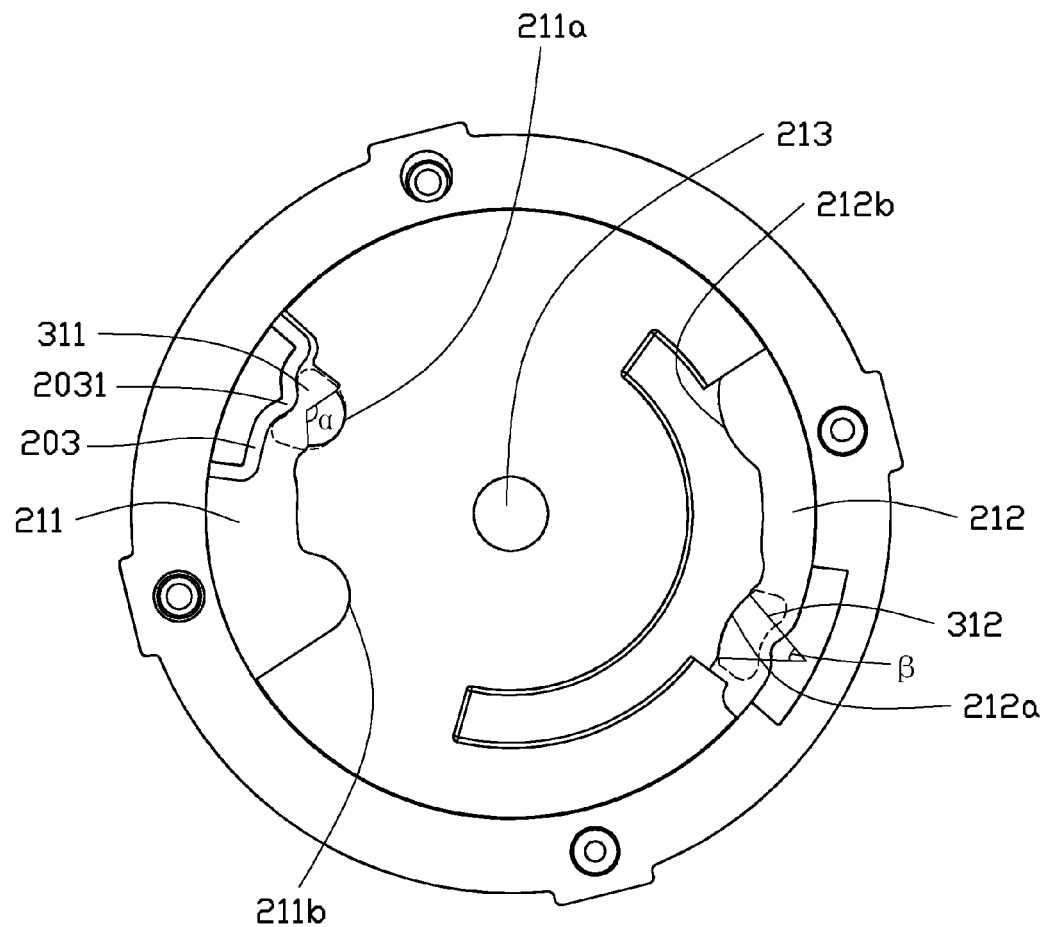
FIG. 6 is similar to FIG. 5, but showing the stand fixing mechanism in an engaged state.

Referring to FIG. 6, when the stand 30 is fixed on the main body 20 through the stand fixing mechanism 21, the first protruding member 311 is received and secured in the first cutout 211a, and the second protruding member 312 is received and secured in the second cutout 212a, the securing force (along the direction of arrow B) applied to the first protruding member 311 by the first cutout 211a is greater than that applied to the second protruding member 312 by the second cutout 212a. This results that the first protruding member 311 is more difficult to disengage (along the direction of arrow A) from the first cutout 211a while the second protruding member 312 is easier to disengage (along the direction of arrow A) the second cutout 212a, when the device 10 falls from a table, the free end of the stand 30 may be the first to hit the floor, and a sudden force is applied to the stand fixing mechanism 21. A tab 2031 is disposed on the protrusion 203 and is opposite to the first cutout 211a. When the first protruding member 311 is received and secured in the first cutout 211a, the tab 2301 of the protrusion 203 also secures the first protruding member 311 to cause that the first protruding member 311 is more difficult to disengage from the first cutout 211a. In the exemplary embodiment, the contacting radian α between the first protruding member 311 and the first cutout 211a is greater than the contacting radian β between the second protruding member 312 and the second cutout 212a. This results in the securing force applied to the first protruding member 311 by the first cutout 211a is greater than that applied to the second protruding member 312 by the second cutout 212a, so that the first protruding member 311 is more difficult to disengage from the first cutout 211a while the second protruding member 312 is easier to disengage the second cutout 212a.

In another alternative embodiment, the first protruding member 311 is interference fit with the first cutout 211, and the second protruding member 312 is also interference fit with the second cutout 212a. The interference fit degree between the first protruding member 311 and the first cutout 211a is greater than that between the second protruding member 312 and the second cutout 212a.

Figure 5:
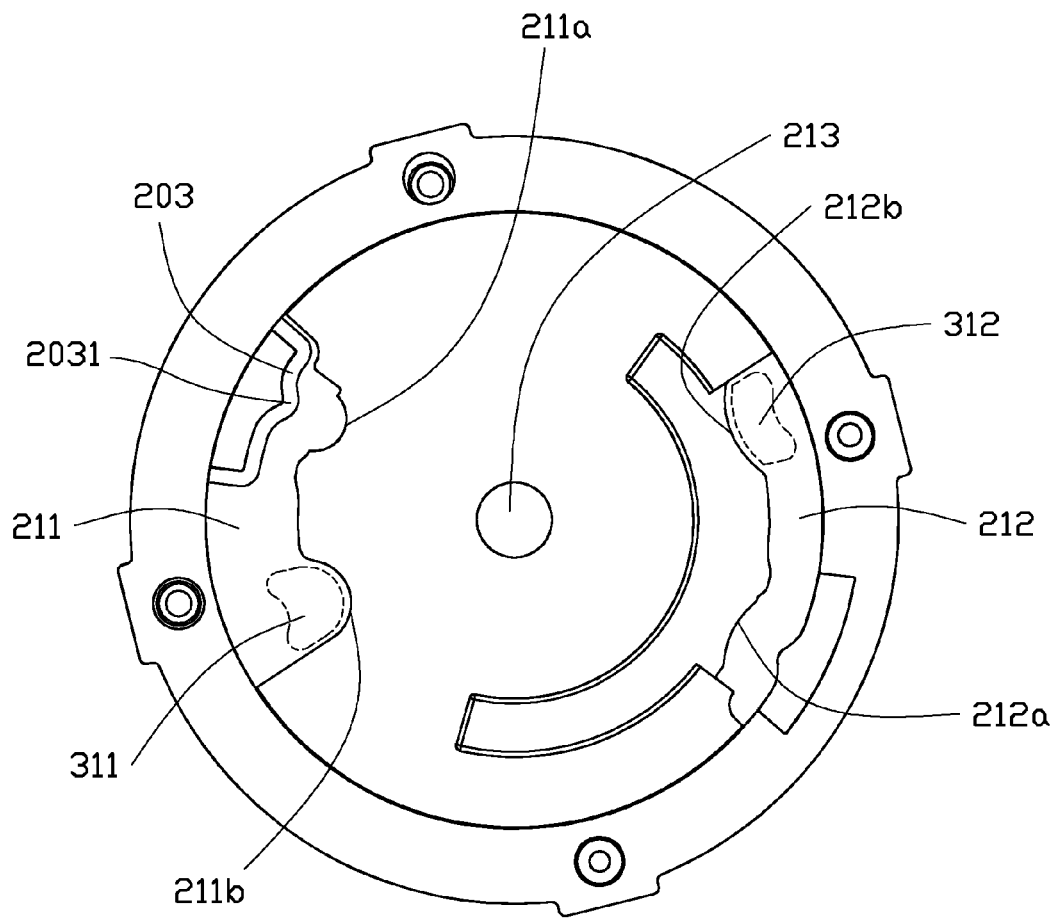
FIG. 5 is a planar view showing the stand fixing mechanism of FIG. 2 in a disengaged state.

Referring to FIGS. 3 and 5, a protruding post 213 protrudes from the first connection member 201, and a locating hole 313 is defined in the second connection member 301. The locating hole 313 receives the protruding post 213 when the stand 30 is fixed in the main body 20.

Referring to FIG. 5, to fix the stand 30 on the device 10, first, put the second connection member 301 into the first connection member 201 through the cavity 202, and insert the first protruding member 311 and the second protruding member 312 correspondingly into the third cutout 211b and the fourth cutout 212b. Then, rotate the stand 30 over a predetermined angle (e.g., 45 degrees) to secure the first protruding member 311 and the second protruding member 312 correspondingly in the first cutout 211a and the second cutout 212a. As such, the stand 30 is fixed on the main body 20 of the device 9.

When the device 10 falls from a tabletop and the free end of the stand 30 is the first to hit the floor, a sudden force is exerted on the stand fixing mechanism 21. The second protruding member 312 can disengage from the second cutout 212a easier than the first protruding member 311 can disengage from the first cutout 211a. Therefore, the stand 30 is capable of automatically detaching from the main body 20 to protect the electronic device 10.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
   a main body; and
   a stand fixed to the main body through a stand fixing mechanism; and
   the stand fixing mechanism comprising:
      a first connection member arranged within the main body and defining a first cutout and a second cutout; and
      a second connection member arranged at one end of the stand, and comprising a first protruding member and a second protruding member protruding therefrom;
      wherein a first opening and a second opening are defined in the first connection member, the first opening communicates with the first cutout and the second opening communicates with the second cutout, a protrusion is disposed on the interior edge around the first opening and is opposite to the first cutout, and a tab is disposed on the protrusion and is opposite to the first cutout;
      the second connection member is detachably connected to the first connection member, the first cutout receives and secures the first protruding member, and the second cutout receives and secures the second protruding member, the tab of the protrusion secures the first protruding member to generate a securing force between the first protruding member and the first cutout, the securing force applied to the first protruding member in a direction away from the direction of the second connection member detaching from the first connection member, and the securing force applied to the first protruding member by the first cutout is greater than that applied to the second protruding member by the second cutout to enable the second connection member to automatically detach from the main body due to the impact of falling on the ground.

2. The electronic device as claimed in claim 1, wherein a third cutout defined in the first connection member communicates with the first opening; and a fourth cutout defined in the first connection member communicates with the second opening.

3. The electronic device as claimed in claim 1, wherein a contacting radian between the first protruding member and the first cutout is greater than that between the second protruding member and the second cutout.

4. The electronic device as claimed in claim 1, wherein the interference fit degree between the first protruding member and the first cutout is greater than that between the second protruding member and the second cutout.

5. The electronic device as claimed in claim 1, wherein the roughness degree between the first protruding member and the first cutout is greater than that between the second protruding member and the second cutout.

6. The electronic device as claimed in claim 1, wherein a cavity is defined in the main body, the first connection member is disposed in the cavity and is integrally formed with the main body.

7. The electronic device as claimed in claim 1, wherein the size of the free ends of the first protruding member and the second protruding member are greater than that of the fixed end of the first protruding member and the second protruding member.

8. The electronic device as claimed in claim 1, wherein a protruding post protrudes from the first connection member, and a locating hole is defined in the second connection member for receiving the protruding post.

9. A stand fixing mechanism applied in an electronic device which is supported to stand on a floor or on a table by a stand fixed in the main body of the electronic device through the stand fixing mechanism, comprising:
   a first connection member arranged within the main body and defining a first cutout and a second cutout; and
   a second connection member arranged at one end of the stand, and comprising a first protruding member and a second protruding member protruding therefrom;
   wherein a first opening and a second opening are defined in the first connection member, the first opening communicates with the first cutout and the second opening communicates with the second cutout, a protrusion is disposed on the interior edge around the first opening and is opposite to the first cutout, and a tab is disposed on the protrusion and is opposite to the first cutout;
   the second connection member is detachably connected to the first connection member, the first cutout receives and secures the first protruding member, and the second cutout receives and secures the second protruding member, the tab of the protrusion secures the first protruding member to generate a securing force between the first protruding member and the first cutout, the securing force applied to the first protruding member in a direction away from the direction of the second connection member detaching from the first connection member, and the securing force applied to the first protruding member by the first cutout is greater than that applied to the second protruding member by the second cutout to enable the second connection member to automatically detach from the main body due to the impact of falling on the ground.

10. The stand fixing mechanism as claimed in claim 9, wherein a third cutout defined in the first connection member communicates with the first opening; and a fourth cutout defined in the first connection member communicates with the second opening.

11. The stand fixing mechanism as claimed in claim 9, wherein a contacting radian between the first protruding member and the first cutout is greater than that between the second protruding member and the second cutout.

12. The stand fixing mechanism as claimed in claim 9, wherein the interference fit degree between the first protruding member and the first cutout is greater than that between the second protruding member and the second cutout.

13. The stand fixing mechanism as claimed in claim 9, wherein the roughness degree between the first protruding member and the first cutout is greater than that between the second protruding member and the second cutout.

14. The stand fixing mechanism as claimed in claim 9, wherein a cavity is defined in the main body, the first connection member is disposed in the cavity and is integrally formed with the main body.

15. The stand fixing mechanism as claimed in claim 9, wherein the size of the free ends of the first protruding member and the second protruding member are greater than that of the fixed end of the first protruding member and the second protruding member.

16. The stand fixing mechanism as claimed in claim 9, wherein protruding post protrudes from the first connection member, and a locating hole is defined in the second connection member for receiving the protruding post.

17. An electronic device comprising:
a main body; and
a stand fixed to the main body through a stand fixing mechanism; and
the stand fixing mechanism comprising:
a first connection member arranged within the main body and defining a first cutout and a second cutout; and
a second connection member arranged at one end of the stand, and comprising a first protruding member and a second protruding member protruding therefrom;
wherein the second connection member is detachably connected to the first connection member;
the first cutout receives and secures the first protruding member, the first protruding member is interference fit with the first cutout to generate a first securing force between the first protruding member and the first cutout, the first securing force being applied to the first protruding member in a direction away from the direction of the second connection member detaching from the first connection member;
the second cutout receives and secures the second protruding member, the second protruding member is interference fit with the second cutout to generate a second securing force between the second protruding member and the second cutout, the second securing force being applied to the second protruding member in a direction away from the direction of the second connection member detaching from the first connection member;
an interference fit degree between the first protruding member and the first cutout is greater than that between the second protruding member and the second cutout, and the first securing force applied to the first protruding member by the first cutout is greater than the second securing force applied to the second protruding member by the second cutout to enable the second connection member to automatically detach from the main body due to the impact of falling on the ground.

18. The electronic device as claimed in claim 17, wherein a first opening and a second opening are defined in the first connection member, the first opening communicates with the first cutout and the second opening communicates with the second cutout.

* * * * *